(12) United States Patent
Nayak et al.

(10) Patent No.: US 8,711,653 B2
(45) Date of Patent: Apr. 29, 2014

(54) CHANGING A SYSTEM CLOCK RATE SYNCHRONOUSLY

(75) Inventors: Vijaykumar Nayak, San Diego, CA (US); Prajna Raghavendra Poorna, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 76 days.

(21) Appl. No.: 13/517,618

(22) Filed: Jun. 14, 2012

(65) Prior Publication Data

US 2013/0339633 A1    Dec. 19, 2013

(51) Int. Cl.
*G11C 8/00* (2006.01)
(52) U.S. Cl.
USPC .................. 365/233.1; 365/233.11; 365/222

(58) Field of Classification Search
USPC ............ 365/233.1, 233.11, 222, 226, 230.03; 709/214, 219, 224; 713/322, 324, 600, 713/300
See application file for complete search history.

(56) References Cited

U.S. PATENT DOCUMENTS

| 6,920,572 B2 * | 7/2005 | Nguyen et al. | 713/322 |
| 7,965,575 B2 * | 6/2011 | Kajigaya | 365/230.03 |
| 8,438,416 B2 * | 5/2013 | Kocev et al. | 713/601 |

\* cited by examiner

*Primary Examiner* — David Lam

(57) ABSTRACT

A system includes a shared memory and a plurality of processor cores communicatively coupled to the shared memory. The system includes a processor core memory and a clock subsystem for providing a clock signal to the shared memory and the plurality of processor cores. Each of the plurality of processor cores executes instructions stored in the processor core memory for synchronously changing the clock rate provided by the clock subsystem to the plurality of processor cores.

15 Claims, 12 Drawing Sheets

CHANGING A SYSTEM CLOCK RATE SYNCHRONOUSLY

BACKGROUND

One way to conserve power in a system is to dynamically change the system clock rate when the system enters a low activity or low power state. Generally, the clock rate is changed to a fraction of the normal working frequency when entering a low power mode. The maximum power savings is achieved if the majority of the hardware subsystems of the system including any shared memory of the system can operate at the lowered clock rate. Conventionally, the clock rate of a system having a low power mode is changed asynchronously or the system includes additional hardware specifically configured for assisting in the clock rate change.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined with each other, unless specifically noted otherwise.

Figure 1:
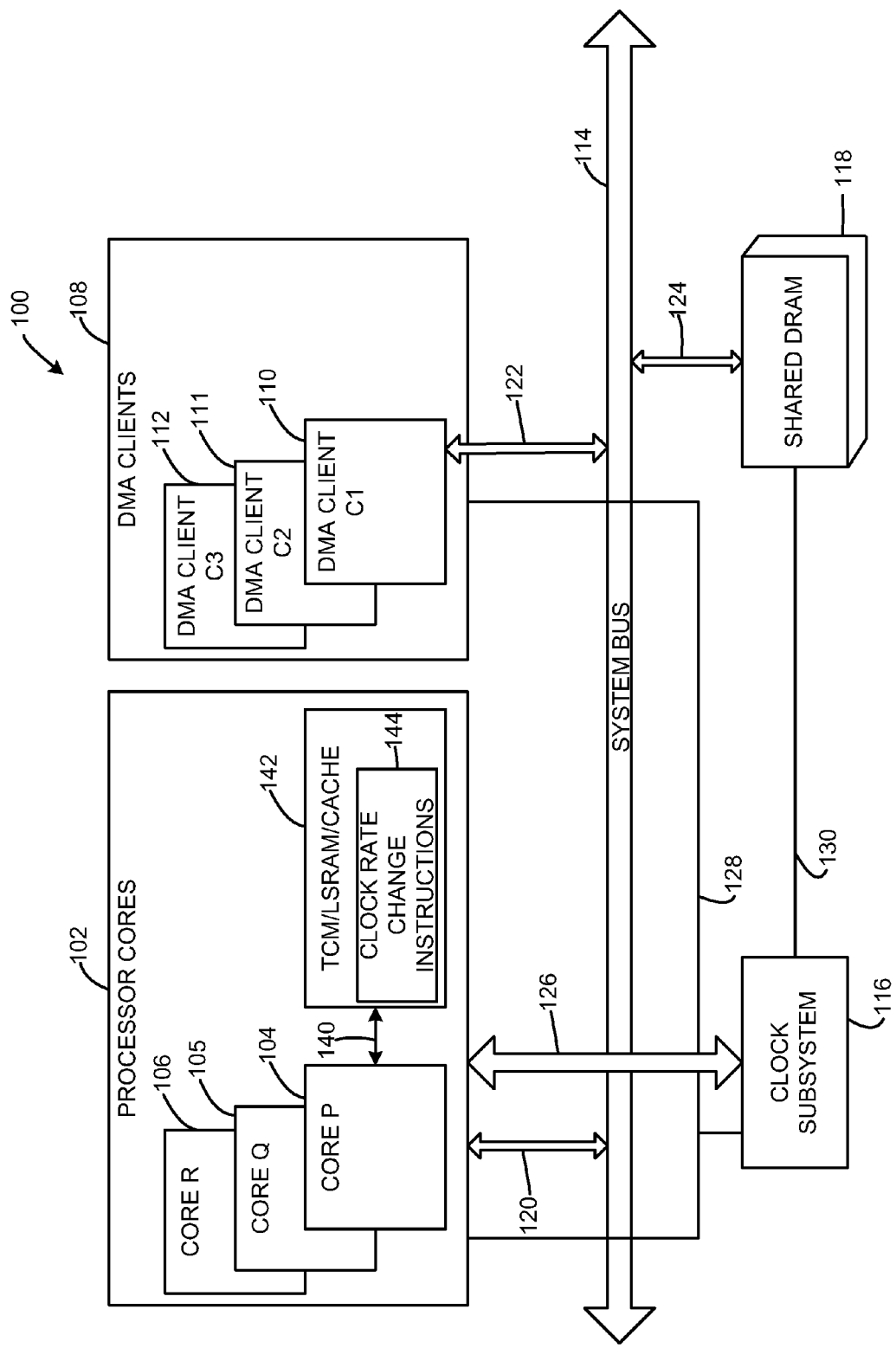
FIG. 1 is a block diagram illustrating one example of a system in which the clock rate can be changed synchronously.

FIG. 1 is a block diagram illustrating one example of a system 100 in which the clock rate can be changed synchronously. System 100 includes a plurality of processor cores 102, a plurality of Direct Memory Access (DMA) clients 108, a system bus 114, a clock subsystem 116, and a shared Dynamic Random Access Memory (DRAM) 118. In one example, the plurality of processor cores 102 includes processor core P 104, processor core Q 105, and processor core R 106. In other examples, the plurality of processor cores 102 includes any suitable number of processor cores. The plurality of processor cores 102 also includes a processor core memory, such as Tightly Coupled Memory (TCM) and/or Local Static Random Access Memory (LSRAM), and/or cache memory 142. The TCM, LSRAM, and/or cache memory 142 stores clock rate change instructions 144 executed by processor cores 102 for dynamically changing the clock rate in system 100. In one example, the plurality of DMA clients 108 includes DMA client C1 110, DMA client C2 111, and DMA client C3 112. In other examples, the plurality of DMA clients 108 includes any suitable number of DMA clients.

The clock rate in system 100 is changed synchronously without additional hardware specifically configured for assisting in changing the clock rate. The synchronous clock rate change is scalable to a system including any suitable number of processor cores and any suitable number of DMA client devices. Changing the clock rate dynamically in system 100 saves power when the system enters a low activity or low power state. In one example, the clock rate is changed to a fraction of the normal working frequency when entering the low activity or low power state. In one example, system 100 is a printer or any other suitable system in which a low power mode may be used. Each of the plurality of DMA clients 108 may include a Universal Serial Bus (USB) host, a USB device, an Ethernet device, a WiFi device, a Liquid Crystal Display (LCD) controller, a NAND flash controller, an audio device, a photo device, or another suitable DMA device.

Each of the plurality of processor cores 102 is communicatively coupled to shared DRAM 118 through a first communication link 120, system bus 114, and a communication link 124. Each of the plurality of DMA clients 108 is communicatively coupled to shared DRAM 118 through a second communication link 122, system bus 114, and communication link 124. At least one of the plurality of processor cores 102 is communicatively coupled to clock subsystem 116 through communication link 126. In this example, processor core P is communicatively coupled to clock subsystem 116. Processor core P is communicatively coupled to TCM/LSRAM/Cache 142 though communication link 140. Clock subsystem 116 provides a clock signal to each of the plurality of processor cores 102 and each of the plurality of DMA clients 108 through a clock signal path 128. Clock subsystem 116 provides a clock signal to shared DRAM 118 through a clock signal path 130.

Clock subsystem 116 is synchronously tied to each of the plurality of processor cores 102 and each of the plurality of DMA clients 108. Each of the plurality of processor cores 102 and each of the plurality of DMA clients 108 access shared DRAM 118 as main memory to perform synchronous read and write operations via system bus 114. In one example, system bus 114 is an AXI bus or another suitable bus. In one example, the plurality of processor cores 102 run different operating systems. Each of the plurality of DMA clients 108 is subscribed to one of the plurality of processor cores 102 such that each of the plurality of DMA clients 108 is controlled by one of the plurality of processor cores 102.

In one example, processor core P 104 determines when system 100 should enter a low power state. In response to determining that system 100 should enter a low power state, processor core P 104 executes clock rate change instructions 144 for synchronously changing the clock rate of system 100. To synchronously change the clock rate of system 100, processor core P 104 first informs each of the plurality of processor cores 102 and each of the plurality of DMA clients 108 to stop accessing shared DRAM 118. Processor core P 104 then instructs clock subsystem 116 to change the clock rate via communication link 126. Once the clock subsystem 116 has changed the clock rate, processor core P 104 informs each of the plurality of processor cores 102 and each of the plurality of DMA clients 108 to start accessing shared DRAM 118 at the new clock rate.

Figure 2:
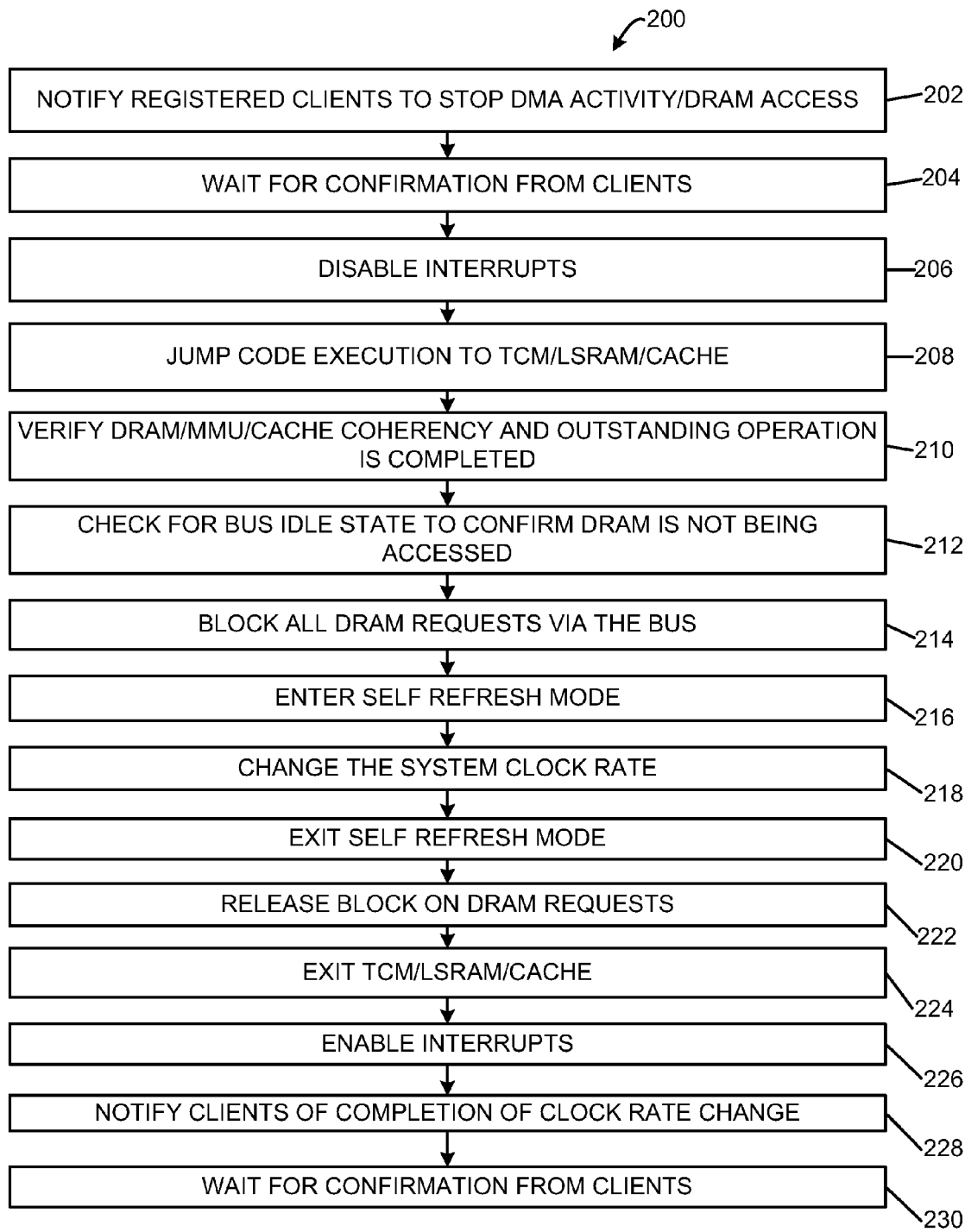
FIG. 2 is a flow diagram illustrating one example of a process for changing the clock rate in a multicore system.

FIG. 2 is a flow diagram illustrating one example of a process 200 for changing the clock rate in a multicore system, such as system 100 previously described and illustrated with reference to FIG. 1. Process 200 is implemented by one of the plurality of processor cores, which is defined as the primary core in the system, such as processor core P 104.

At 202, in response to a clock rate change request, registered clients are notified to stop DMA activity and/or DRAM access. For example, processor core P 104 (FIG. 1) notifies processor core Q 105, processor core R 106, DMA client C1 110, DMA client C2 111, and DMA client C3 112 to stop DMA activity and DRAM access to shared DRAM 118.

At 204, the primary core waits for confirmation from the clients that they have stopped DMA activity and/or DRAM access. For example, processor core P 104 (FIG. 1) waits from confirmation from processor core Q 105, processor core R 106, DMA client C1 110, DMA client C2 111, and DMA client C3 112 that they have stopped DMA activity and DRAM access to shared DRAM 118.

At 206, interrupts are disabled. For example, interrupts for processor core P 104, processor core Q 105, processor core R 106, DMA client C1 110, DMA client C2 111, and DMA client C3 112 are disabled. At 208, the primary core jumps code execution to TCM and/or LSRAM and/or cache. For example, processor core P 104 (FIG. 1) jumps code execution to TCM/LSRAM/cache 142.

At 210, the primary core verifies the coherency of DRAM and/or Memory Management Unit (MMU) and/or cache and that any outstanding operation is completed. At 212, the primary core checks for the bus idle state to confirm that the DRAM is not being accessed. For example, processor core P 104 (FIG. 1) checks for the bus idle state of system bus 114 to confirm that shared DRAM 118 is not being accessed.

At 214, all DRAM requests are blocked via the bus. In one example, a Memory Control Block (MCB) suspend is used to block all DRAM requests via the bus. For example, all DRAM requests are blocked via the system bus 114 (FIG. 1). At 216, the self refresh mode of the DRAM is entered. For example, the self refresh mode of shared DRAM 118 (FIG. 1) is entered.

At 218, the system clock rate is changed. For example, in response to a request from processor core P 104 (FIG. 1), clock subsystem 116 changes the clock rate. At 220, once the clock rate has been changed, the self refresh mode of the DRAM is exited. For example, the self refresh mode of shared DRAM 118 (FIG. 1) is exited.

At 222, the block on DRAM requests is released. In one example, an MCB release is used to release the block on DRAM requests. For example, all DRAM requests via the system bus 114 (FIG. 1) are unblocked. At 224, the primary core exits the TCM and/or LSRAM and/or cache code execution. For example, processor core P 104 (FIG. 1) exits code execution from TCM/LSRAM/cache 142.

At 226, interrupts are enabled. For example, interrupts for processor core P 104, processor core Q 105, processor core R 106, DMA client C1 110, DMA client C2 111, and DMA client C3 112 are enabled. At 228, the primary core notifies the clients of completion of the clock rate change. For example, processor core P 104 (FIG. 1) notifies processor core Q 105, processor core R 106, DMA client C1 110, DMA client C2 111, and DMA client C3 112 of completion of the clock rate change.

At 230, the primary core waits for confirmation from the clients that the clients have resumed DMA activity and/or DRAM access at the new clock rate. For example, processor core P 104 (FIG. 1) waits for confirmation from processor core Q 105, processor core R 106, DMA client C1 110, DMA client C2 111, and DMA client C3 112 that they have resumed DMA activity and DRAM access to shared DRAM 118 at the new clock rate.

Figure 3:
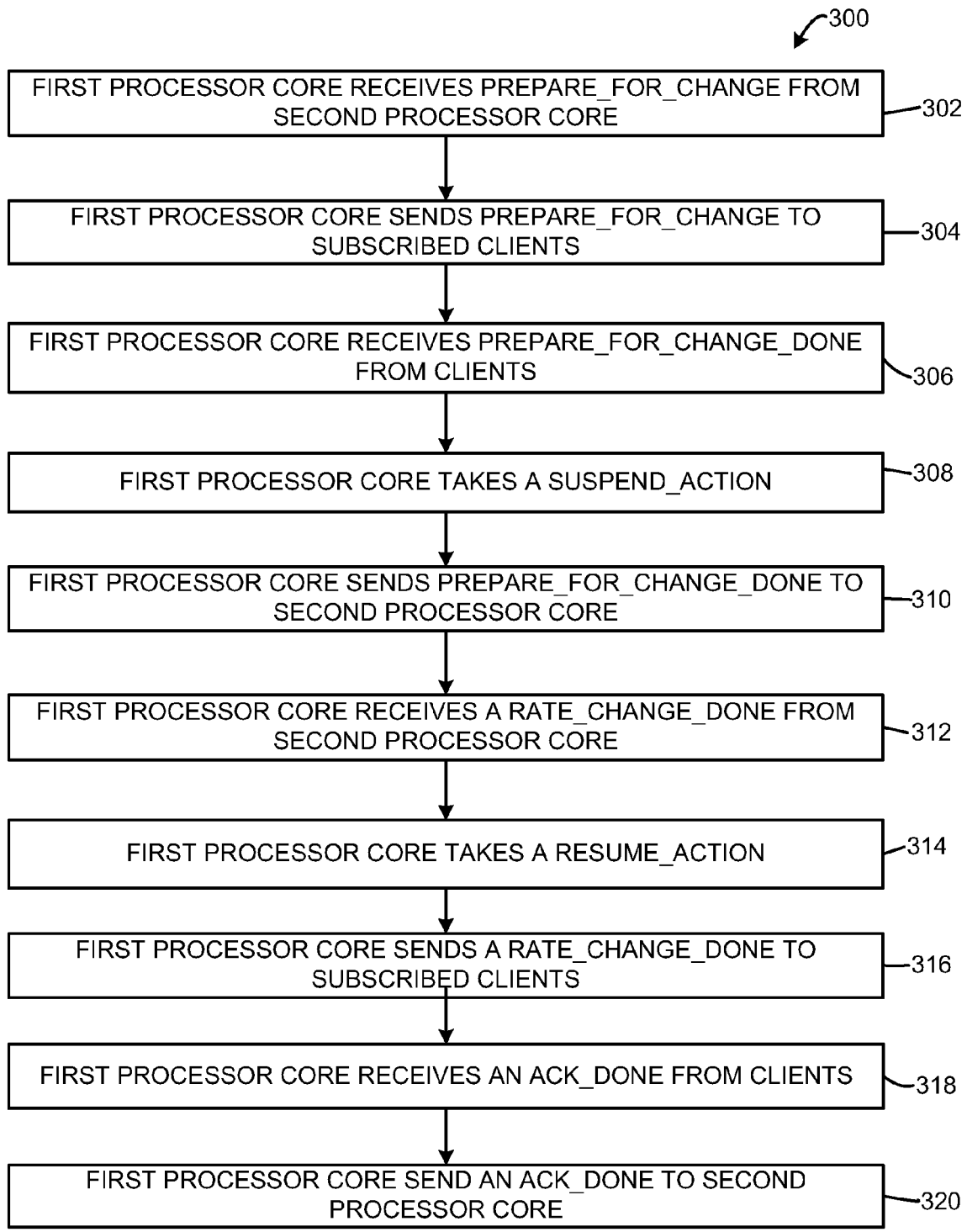
FIG. 3 is a flow diagram illustrating one example of a process for changing the clock rate in a system from the perspective of a processor core.

FIG. 3 is a flow diagram illustrating one example of a process 300 for changing the clock rate in a system from the perspective of a processor core, such as processor core Q 105 previously described and illustrated with reference to FIG. 1. Process 300 is performed by each of the plurality of processor cores.

At 302, a first processor core receives a prepare for change (Prepare_For_Change) signal from a second processor core. The Prepare_For_Change signal notifies the first processor core that the clock rate is going to be changed. The first processor core is the processor core performing process 300 and the second processor core is another processor core in the system that is linked to the first processor core for changing the clock rate (i.e., the second processor core is the source of the Prepare_For_Change signal sent to the first processor core). For example, processor core Q 105 (FIG. 1) receives a Prepare_For_Change signal from processor core P 104. In another example, the Prepare_For_Change signal is generated internally by the first processor core in response to entering into a low actively or low power mode (i.e., the first processor core is the source of the Prepare_For_Change signal).

At 304, in response to receiving the Prepare_For_Change signal from the second processor core, the first processor core sends a Prepare_For_Change signal to subscribed clients. The subscribed clients may include DMA clients and/or other processor cores. The Prepare_For_Change signal informs the subscribed clients that the clock rate is going to be changed and that the subscribed clients should suspend accessing the shared memory. For example, processor core Q 105 (FIG. 1) sends a Prepare_For_Change signal to DMA client C1 110 and DMA client C2 111, which are in one example subscribed to processor core Q 105. In addition, in one example, processor core R 106 may be subscribed to processor core Q 105 for clock rate change purposes. In this case, processor core Q 105 also sends a Prepare_For_Change signal to processor core R 106.

At 306, the first processor core receives a prepare for change done (Prepare_For_Change_Done) signal from the subscribed clients. The Prepare_For_Change_Done signal indicates that each of the subscribed clients has suspended access to the shared memory. For example, processor core Q 105 (FIG. 1) receives a Prepare_For_Change_Done signal from each of DMA client C1 110, DMA client C2 111, and processor core R 106 once they have suspended DMA activity and DRAM access to shared DRAM 118.

At 308, in response to receiving the Prepare_For_Change_Done signal from each subscribed client, the first processor core takes a suspend action (Suspend_Action). The Suspend_Action suspends access to the shared memory. For example, processor core Q 105 (FIG. 1) takes a Suspend_Action to suspend accessing shared DRAM 118.

At 310, in response to taking the Suspend_Action, the first processor core sends a Prepare_For_Change_Done signal to the second processor core. For example, processor core Q 105 (FIG. 1) sends a Prepare_For_Change_Done signal to processor core P 104.

At 312, the first processor core receives a rate change done (Rate_Change_Done) signal from the second processor core.

The Rate_Change_Done signal indicates that the clock rate has been changed. For example, processor core Q 105 (FIG. 1) receives a Rate_Change_Done signal from processor core P 104 once clock subsystem 116 has changed the clock rate.

At 314, in response to receiving the Rate_Change_Done signal from the second processor core, the first processor core takes a resume action (Resume_Action). The Resume_Action resumes access to the shared memory. For example, processor core Q 105 (FIG. 1) takes a Resume_Action to resume accessing shared DRAM 118.

At 316, the first processor core sends a Rate_Change_Done signal to each subscribed client. For example, processor core Q 105 (FIG. 1) sends a Rate_Change_Done signal to DMA client C1 110, DMA client C2 111, and processor core R 106 informing them that the clock rate has been changed.

At 318, the first processor core receives an acknowledge done (Ack_Done) signal from each of the subscribed clients. The Ack_Done signal indicates that the subscribed client has resumed accessing the shared memory. For example, processor core Q 105 (FIG. 1) receives an Ack_Done signal from each of DMA client C1 110, DMA client C2 111, and processor core R 106 once they resume DMA activity and DRAM access to shared DRAM 118.

At 320, the first processor core sends an Ack_Done signal to the second processor core informing the second processor core that the first processor core and the clients subscribed to the first processor core have resumed accessing the shared memory. For example, processor core Q 105 (FIG. 1) sends an Ack_Done signal to processor core P 104 informing processor core P 104 that processor core Q 105 has resumed accessing shared DRAM 118.

Figure 4:
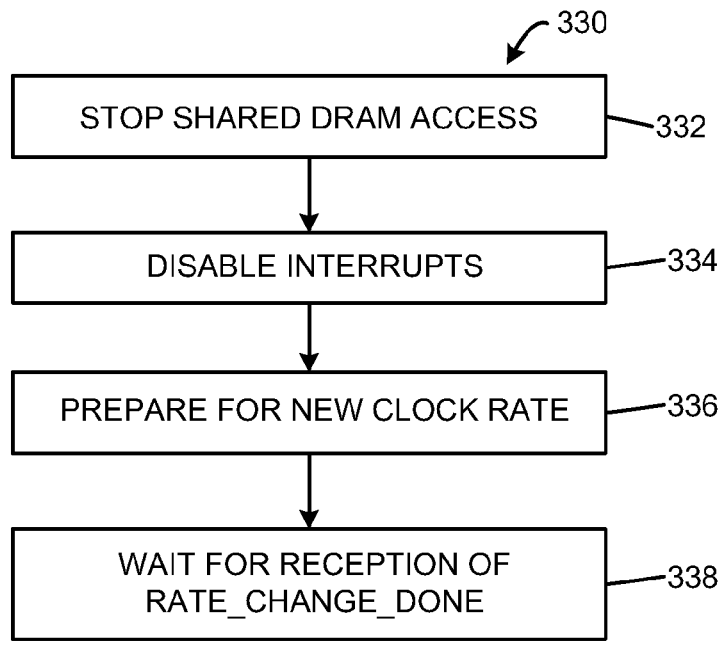
FIG. 4 is a flow diagram illustrating one example of a process for a processor core to suspend access to a Dynamic Random Access Memory (DRAM).

FIG. 4 is a flow diagram illustrating one example of a process 330 for a processor core to suspend access to a DRAM. Process 330 is performed at block 308 of FIG. 3. At 332, the processor core stops accessing the shared DRAM. For example, processor core Q 105 (FIG. 1) stops accessing shared DRAM 118. At 334, the interrupts of the processor core are disabled. For example the interrupts of processor core Q 105 (FIG. 1) are disabled. At 336, the processor core prepares for the new clock rate. At 338, the processor core waits for the reception of the Rate_Change_Done signal.

Figure 5:
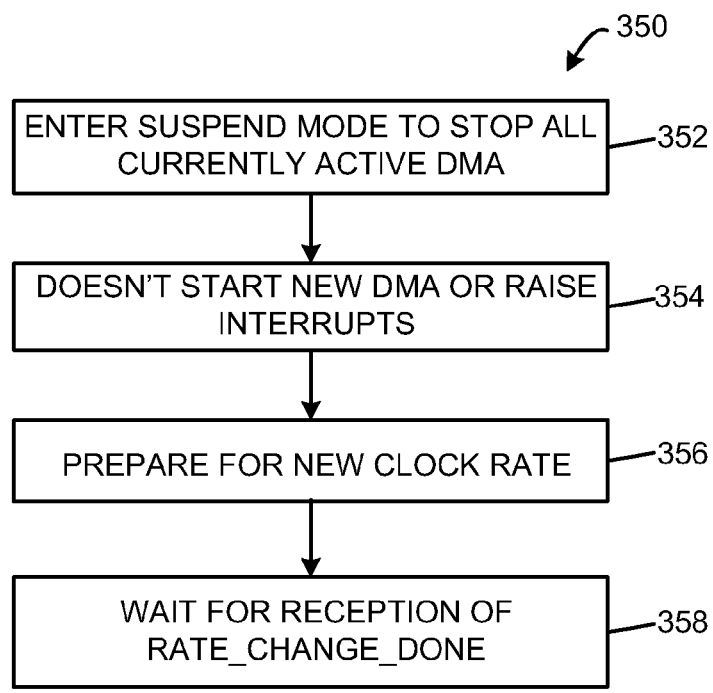
FIG. 5 is a flow diagram illustrating one example of a process for a Direct Memory Access (DMA) client to suspend DMA activity to a DRAM.

FIG. 5 is a flow diagram illustrating one example of a process 350 for a DMA client to suspend DMA activity to a DRAM. Process 350 is performed by a DMA client in response to receiving a Prepare_For_Change signal, such as in response to receiving the Prepare_For_Change signal from block 304 of FIG. 3. At 352, the DMA client enters a suspend mode to stop all currently active DMA activity. For example, in response to a Prepare_For_Change signal, DMA client C1 110 (FIG. 1) enters a suspend mode to stop all currently active DMA activity to shared DRAM 118. At 354, the DMA client is prevented from starting new DMA activity and from raising interrupts. At 356, the DMA client prepares for the new clock rate. At 358, the DMA client waits for the reception of the Rate_Change_Done signal. In response to the Rate_Change_Done signal, the DMA client enters a resume mode such that the DMA client begins normal operations at the new clock rate.

Figure 6:
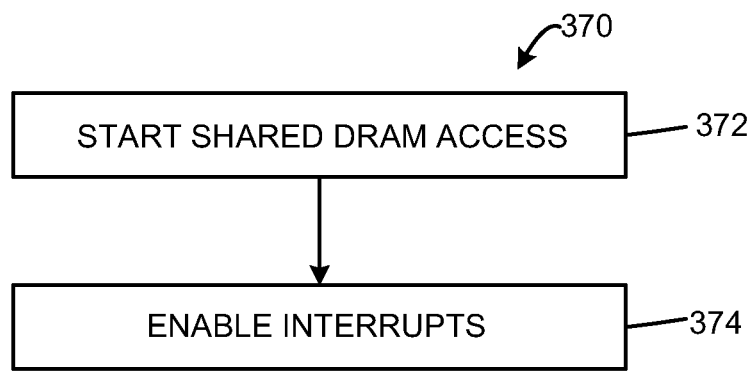
FIG. 6 is a flow diagram illustrating one example of a process for a processor core to resume access to a DRAM.

FIG. 6 is a flow diagram illustrating one example of a process 370 for a processor core to resume access to a DRAM. Process 370 is performed at block 314 of FIG. 3. At 372, the processor core starts accessing the shared DRAM. For example, processor core Q 105 (FIG. 1) starts accessing shared DRAM 118. At 374, the interrupts of the processor core are enabled.

Figure 7:
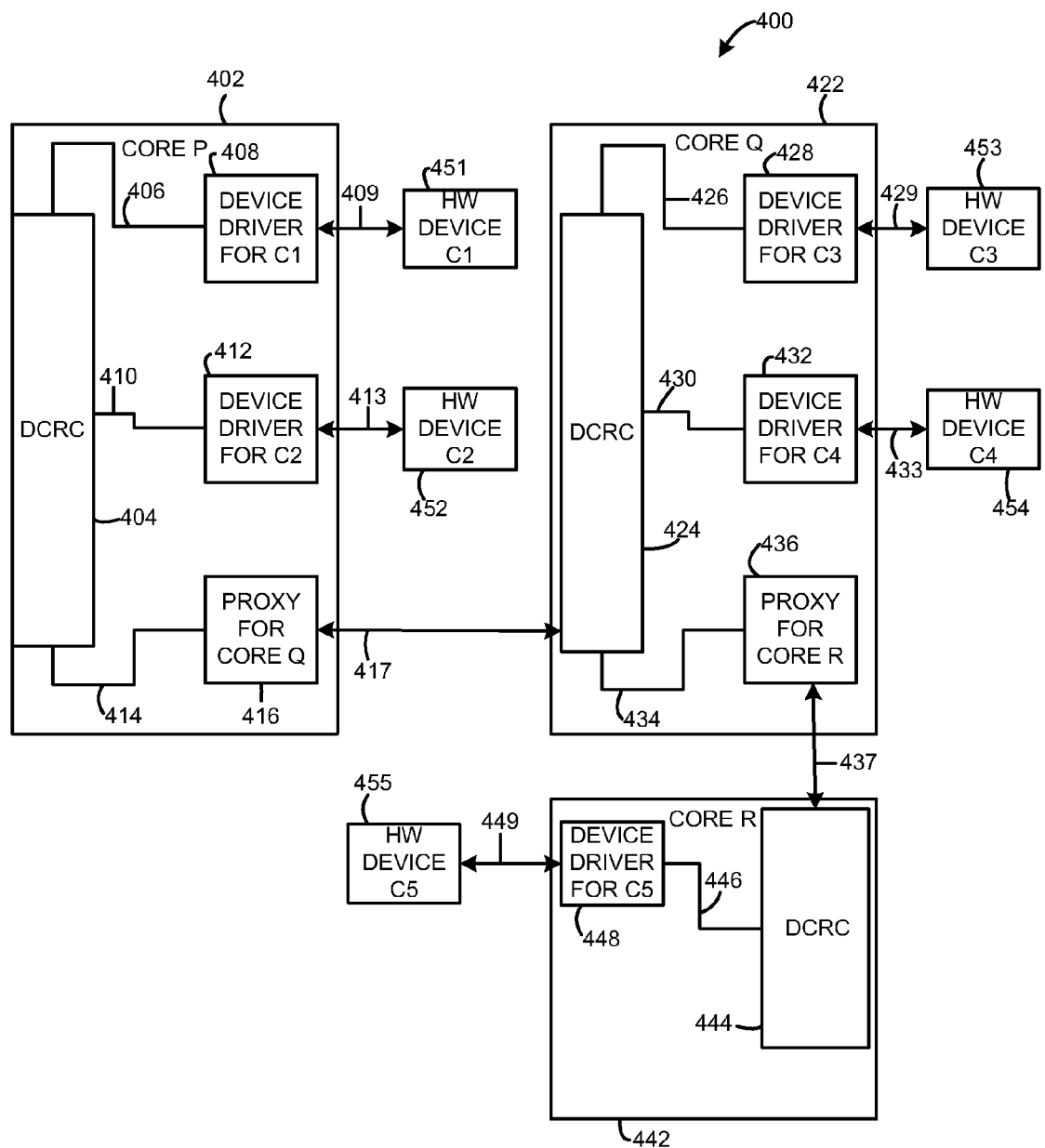
FIG. 7 is a functional block diagram illustrating one example of a system for synchronously changing the clock rate.

FIG. 7 is a functional block diagram illustrating one example of a system 400 for synchronously changing the clock rate. In this example, system 400 has a chained topology. System 400 includes processor core P 402, processor core Q 422, processor core R 422, hardware (HW) device C1 451, HW device C2 452, HW device C3 453, HW device C4 454, and HW device C5 455. In this example, processor core P 402 is the primary core and executes clock rate change instructions stored in processor core memory for synchronously changing the clock rate in system 400.

Processor core P 402 includes a Dynamic Clock Rate Change (DCRC) module 404, a device driver 408 for HW device C1 451, a device driver 412 for HW device C2 452, and a proxy 416 for processor core Q 422. DCRC module 404 is communicatively coupled to device driver 408 through communication link 406. DCRC module 404 is communicatively coupled to device driver 412 through communication link 410. DCRC module 404 is communicatively coupled to proxy 416 through communication link 414. Device driver 408 is communicatively coupled to HW device C1 451 through communication link 409. Device driver 412 is communicatively coupled to HW device C2 452 through communication link 413. Proxy 416 is communicatively coupled to processor core Q 422 through communication link 417.

Processor core Q 422 includes a DCRC module 424, a device driver 428 for HW device C3 453, a device driver 432 for HW device C4 454, and a proxy 436 for processor core R 442. DCRC module 424 is communicatively coupled to device driver 428 through communication link 426. DCRC module 424 is communicatively coupled to device driver 432 through communication link 430. DCRC module 424 is communicatively coupled to proxy 436 through communication link 434. Device driver 428 is communicatively coupled to HW device C3 453 through communication link 429. Device driver 432 is communicatively coupled to HW device C4 454 through communication link 433. Proxy 436 is communicatively coupled to processor core R 442 through communication link 437.

Processor core R 442 includes a DCRC module 444 and a device driver 448 for HW device C5 455. DCRC module 444 is communicatively coupled to device driver 448 through communication link 446. Device driver 448 is communicatively coupled to HW device C5 455 through communication link 449. In other examples, system 400 may include any suitable number of chained processor cores with each processor core including any suitable number of subscribed DMA clients.

In one example, communication links 417 and 437 are used to communicate clock rate change parameters and suspend and resume requests from DCRC module 404 to DCRC module 424 and to DCRC module 444. In one example, the clock rate change parameters include the new clock rate. Communication links 409, 413, 429, 433, and 449 send suspend and resume requests to HW devices 451, 452, 453, 454, and 455, respectively, during a clock rate change process. In one example, the suspend and resume requests correspond to the Prepare_For_Change and Rate_Change_Done signals, respectively, as previously described and illustrated with reference to FIGS. 3-6.

FIGS. 8-12 are flow diagrams illustrating one example of a process for changing the clock rate in system 400 of FIG. 7. In one example, the process of FIGS. 8-12 is performed by DCRC modules 404, 424, and 444 previously described and illustrated with reference to FIG. 7.

Figure 8:
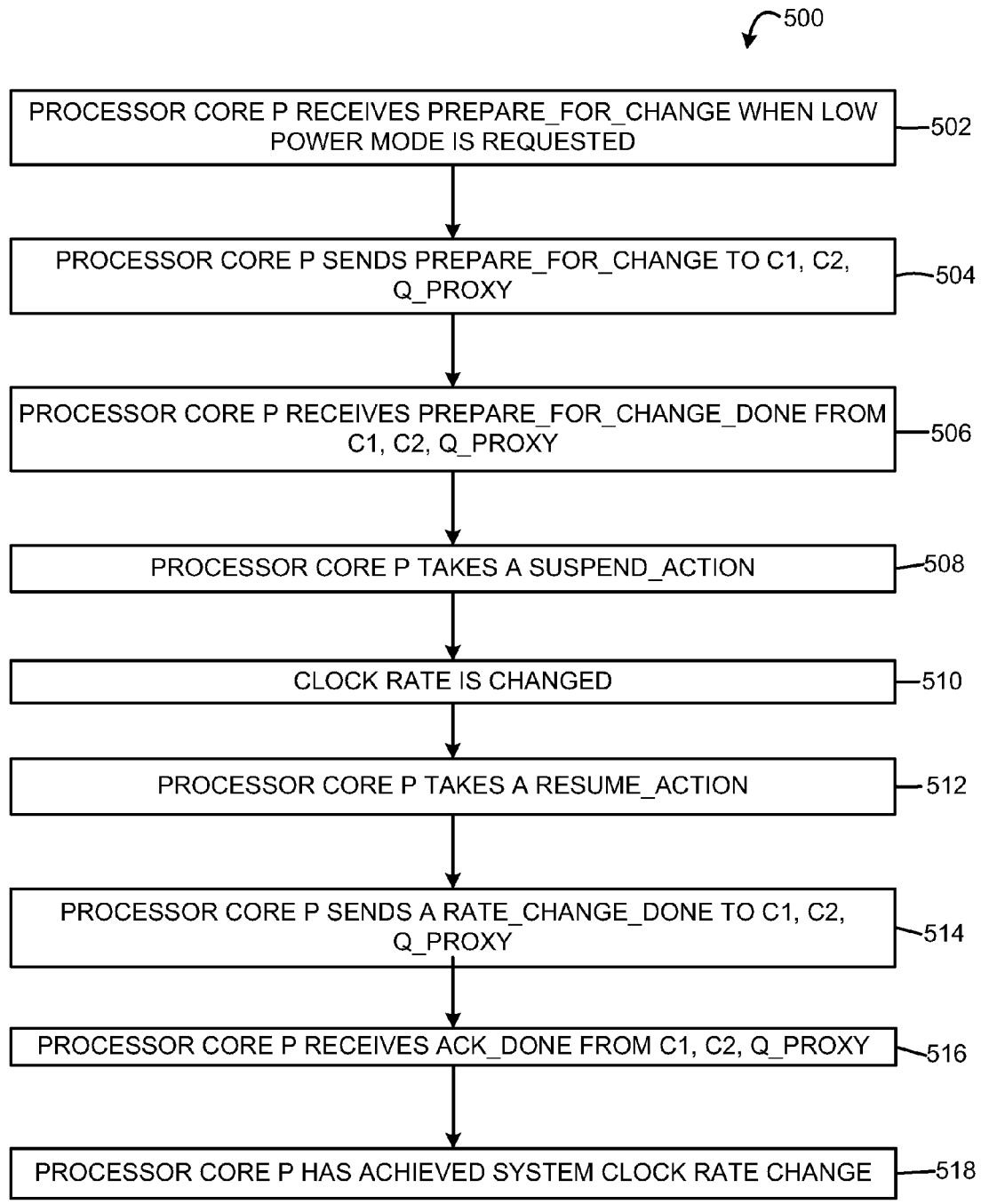
FIGS. 8-12 are flow diagrams illustrating one example of a process for changing the clock rate in the system of FIG. 7.

FIG. 8 is a flow diagram illustrating one example of a process 500 for changing the clock rate in system 400 of FIG. 7 from the perspective of processor core P 402, which is the primary processor core in this example. In one example, process 500 is performed by DCRC module 404 previously described and illustrated with reference to FIG. 7.

At 502, processor core P 402 receives a Prepare_For_Change signal when a low power mode is requested. In one example, the Prepare_For_Change signal is generated internal to processor core P 402 when processor core P 402 determines that a low power mode should be entered. At 504, in response to the Prepare_For_Change signal, processor core P 402 sends a Prepare_For_Change signal to HW client C1 451 via device driver 408, HW client C2 452 via device driver 412, and processor core Q 422 via proxy 416. At 506, processor core P 402 receives a Prepare_For_Change_Done signal from each of HW client C1 451 via device driver 408, HW client C2 452 via device driver 412, and processor core Q 422 via proxy 416.

At 508, in response to receiving the Prepare_For_Change_Done signals, processor core P 402 takes a Suspend_Action. At 510, the clock rate is changed. At 512, in response to the clock rate being changed, processor core P 402 takes a Resume_Action. At 514, processor core P 402 sends a Rate_Change_Done signal to HW client C1 451 via device driver 408, HW client C2 452 via device driver 412, and processor core Q 422 via proxy 416.

At 516, processor core P 402 receives an Ack_Done signal from each of HW client C1 451 via device driver 408, HW client C2 452 via device driver 412, and processor core Q 422 via proxy 416. At 518, processor core P 402 has achieved a system clock rate change for system 400 and the process is complete.

Figure 9:
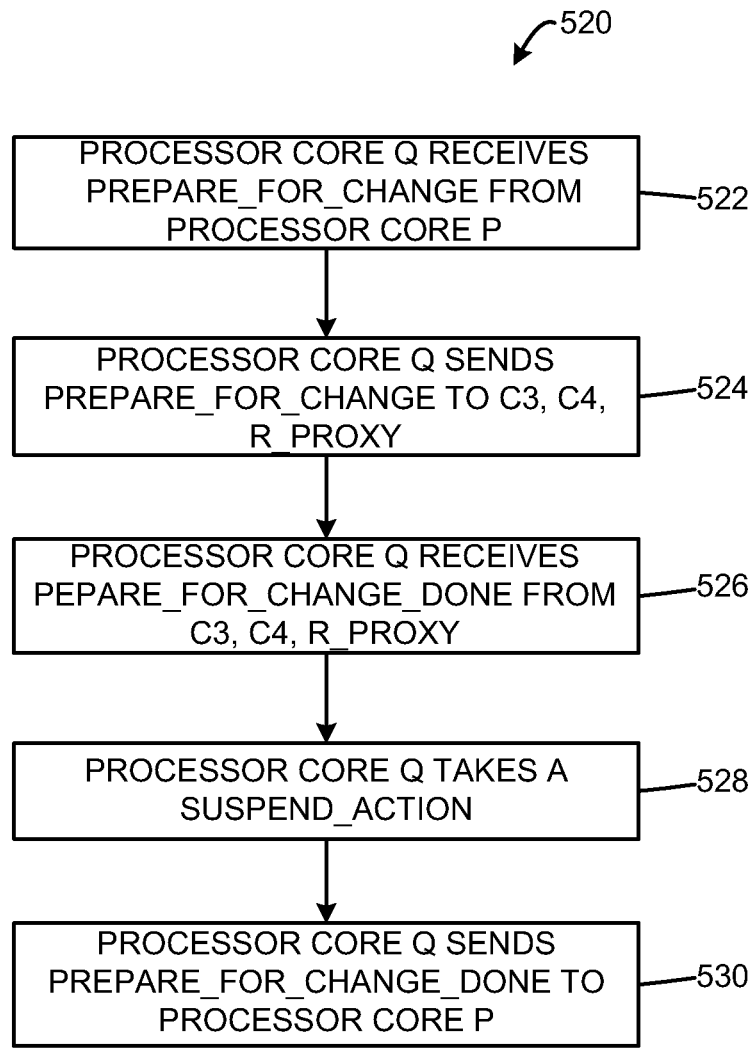

FIG. 9 is a flow diagram illustrating one example of a first portion 520 of a process for changing the clock rate in system 400 of FIG. 7 from the perspective of processor core Q 422. In one example, process 520 is performed by DCRC module 424 previously described and illustrated with reference to FIG. 7.

At 522, processor core Q 422 receives the Prepare_For_Change signal sent from processor core P 402 in block 504 of FIG. 8. At 524, in response to the Prepare_For_Change signal, processor core Q 422 sends a Prepare_For_Change signal to HW client C3 453 via device driver 428, HW client C4 454 via device driver 432, and processor core R 442 via proxy 436.

At 526, processor core Q 422 receives a Prepare_For_Change_Done signal from each of HW client C3 453 via device driver 428, HW client C4 454 via device driver 432, and processor core R 442 via proxy 436. At 528, in response to receiving the Prepare_For_Change_Done signals, processor core Q 422 takes a Suspend_Action. At 530, processor core Q 422 sends a Prepare_For_Change_Done signal to processor core P 402, which is received by processor core P 402 in block 506 of FIG. 8.

Figure 10:
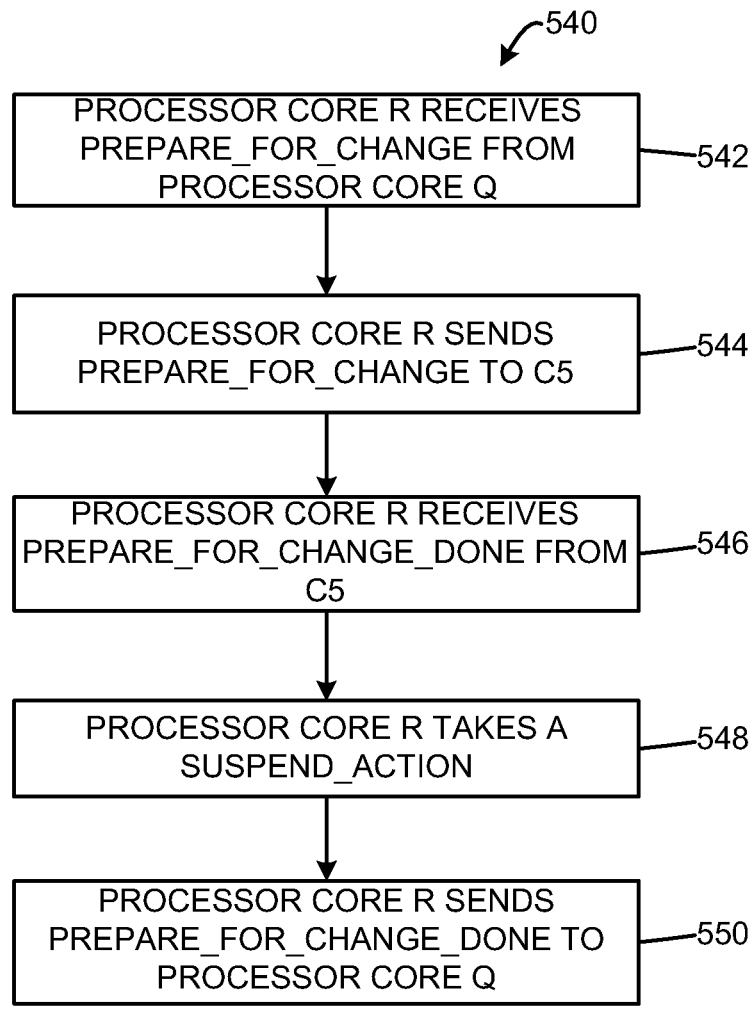

FIG. 10 is a flow diagram illustrating one example of a first portion 540 of a process for changing the clock rate in system 400 of FIG. 7 from the perspective of processor core R 442. In one example, process 540 is performed by DCRC module 444 previously described and illustrated with reference to FIG. 7.

At 542, processor core R 442 receives the Prepare_For_Change signal sent from processor core Q 422 in block 524 of FIG. 9. At 544, in response to the Prepare_For_Change signal, processor core R 442 sends a Prepare_For_Change signal to HW client C5 455 via device driver 448. At 546, processor core R 442 receives a Prepare_For_Change_Done signal from HW client C5 455 via device driver 448. At 548, in response to receiving the Prepare_For_Change_Done signal, processor core R 442 takes a Suspend_Action. At 550, processor core R 442 sends a Prepare_For_Change_Done signal to processor core Q 422, which is received by processor core Q 422 in block 526 of FIG. 9.

Figure 11:
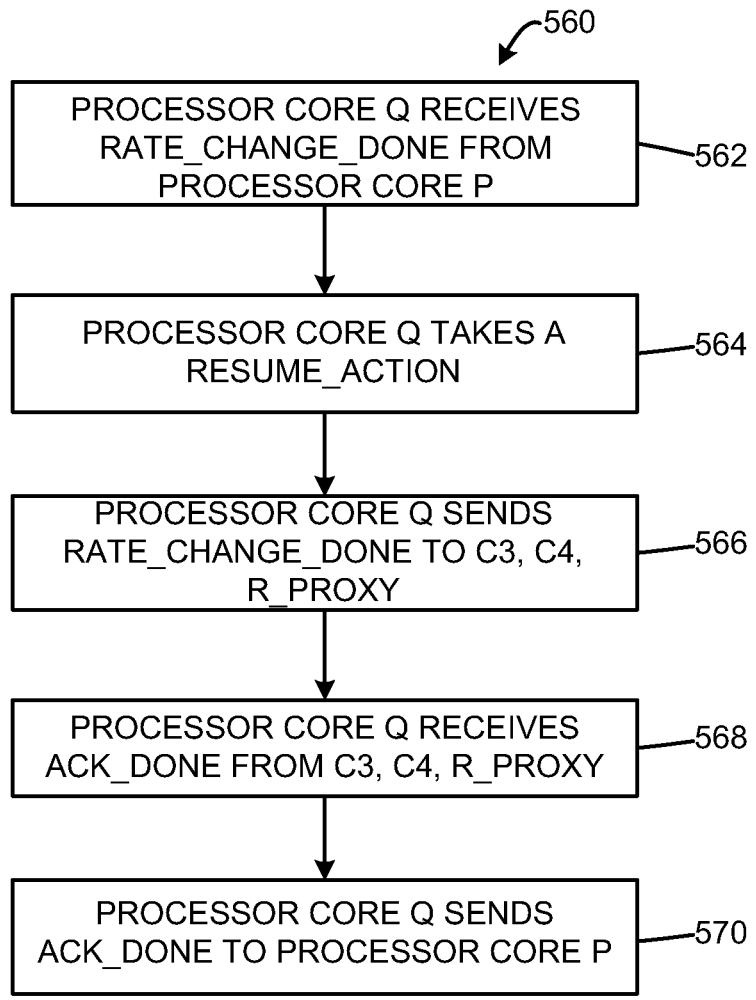

FIG. 11 is a flow diagram illustrating one example of a second portion 560 of a process for changing the clock rate in system 400 of FIG. 7 from the perspective of processor core Q 422. In one example, process 560 is performed by DCRC module 424 previously described and illustrated with reference to FIG. 7.

At 562, processor core Q 422 receives the Rate_Change_Done signal sent from processor core P 402 in block 514 of FIG. 8. At 564, in response to the Rate_Change_Done signal, processor core Q 422 takes a Resume_Action. At 566, processor core Q 422 sends a Rate_Change_Done signal to HW client C3 453 via device driver 428, HW client C4 454 via device driver 432, and processor core R 442 via proxy 436. At 568, processor core Q 422 receives an Ack_Done signal from each of HW client C3 453 via device driver 428, HW client C4 454 via device driver 432, and processor core R 442 via proxy 436. At 570, in response to the Ack_Done signals, processor core Q 422 sends an Ack_Done signal to processor core P 402, which is received by processor core P 402 in block 516 of FIG. 8.

Figure 12:
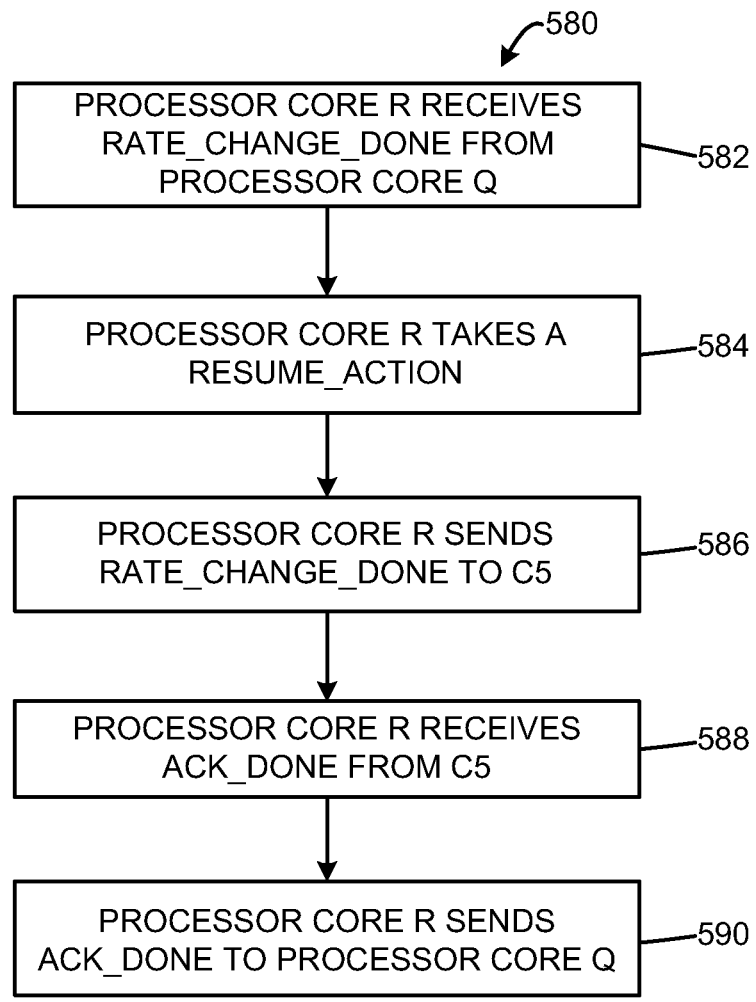

FIG. 12 is a flow diagram illustrating one example of a second portion 580 of a process for changing the clock rate in system 400 of FIG. 7 from the perspective of processor core R 442. In one example, process 580 is performed by DCRC module 444 previously described and illustrated with reference to FIG. 7.

At 582, processor core R 442 receives the Rate_Change_Done signal sent from processor core Q 422 in block 566 of FIG. 11. At 584, in response to the Rate_Change_Done signal, processor core R 442 takes a Resume_Action. At 586, processor core R 442 sends a Rate_Change_Done signal to HW client C5 455 via device driver 448. At 588, processor core R 442 receives an Ack_Done signal from HW client C5 455 via device driver 448. At 590, in response to the Ack_Done signal, processor core R 442 sends an Ack_Done signal to processor core Q 422, which is received by processor core Q 422 in block 568 of FIG. 11.

Figure 13:
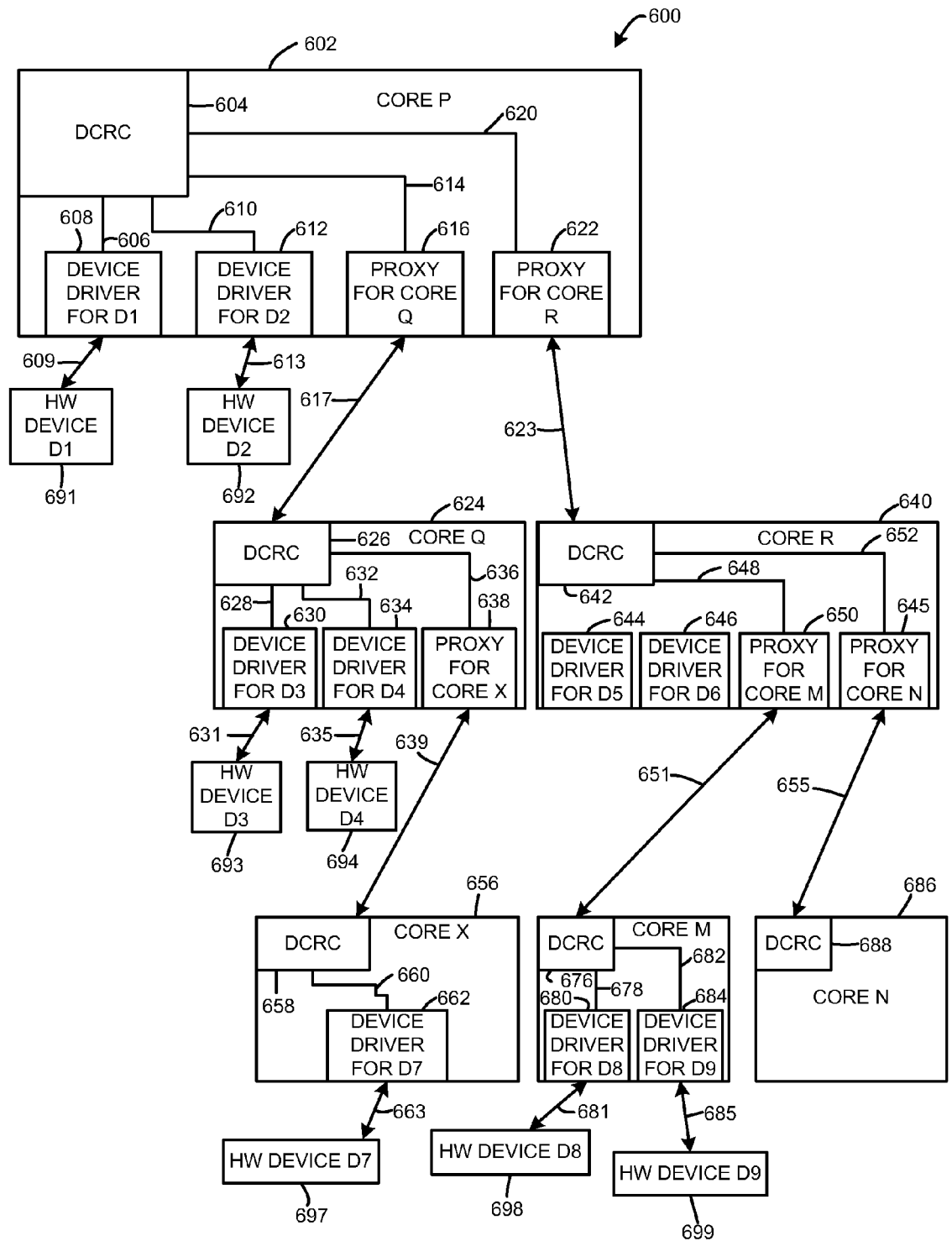
FIG. 13 is a functional block diagram illustrating another example of a system for synchronously changing the clock rate.

FIG. 13 is functional block diagram illustrating another example of a system 600 for synchronously changing the clock rate. In this example, system 600 has a tree topology. System 600 includes processor core P 602, processor core Q 624, processor core R 640, processor core X 656, processor core M 674, processor core N 686, HW device D1 691, HW device D2 692, HW device D3 693, HW device D4 694, HW device D7 697, HW device D8 698, and HW device D9 699. In this example, processor core P 602 is the primary core and executes clock rate change instructions stored in processor core memory for synchronously changing the clock rate in system 600.

Processor core P 602 includes a DCRC module 604, a device driver 608 for HW device D1 691, a device driver 612 for HW device D2 692, a proxy 616 for processor core Q 624, and a proxy 622 for processor core R 640. DCRC module 604 is communicatively coupled to device driver 608 through communication link 606. DCRC module 604 is communicatively coupled to device driver 612 through communication link 610. DCRC module 604 is communicatively coupled to proxy 616 through communication link 614. DCRC module 604 is communicatively coupled to proxy 622 through communication link 620. Device driver 608 is communicatively coupled to HW device D1 691 through communication link 609. Device driver 612 is communicatively coupled to HW device D2 692 through communication link 613. Proxy 616 is communicatively coupled to processor core Q 624 through communication link 617. Proxy 622 is communicatively coupled to processor core R 640 through communication link 623.

Processor core Q 624 includes a DCRC module 626, a device driver 630 for HW device D3 693, a device driver 634 for HW device D4 694, and a proxy 638 for processor core X 656. DCRC module 626 is communicatively coupled to device driver 630 through communication link 628. DCRC module 626 is communicatively coupled to device driver 634 through communication link 632. DCRC module 626 is communicatively coupled to proxy 638 through communication link 636. Device driver 630 is communicatively coupled to HW device D3 693 through communication link 631. Device driver 634 is communicatively coupled to HW device D4 694 through communication link 635. Proxy 638 is communicatively coupled to processor core X 656 through communication link 639.

Processor core R 640 includes a DCRC module 642, a device driver 644 for a non DMA device D5, a device driver 646 for a non DMA device D6, a proxy 650 for processor core M 674, and a proxy 654 for processor core N 686. DCRC module 642 is communicatively coupled to proxy 650 through communication link 648. DCRC module 642 is communicatively coupled to proxy 654 through communication link 652. Proxy 650 is communicatively coupled to processor core M 674 through communication link 651. Proxy 654 is communicatively coupled to processor core N 686 through communication link 655.

Processor core X 656 includes a DCRC module 658 and a device driver 662 for HW device D7 697. DCRC module 658 is communicatively coupled to device driver 662 through communication link 660. Device driver 662 is communicatively coupled to HW device D7 697 through communication link 663.

Processor core M 674 includes a DCRC module 676, a device driver 680 for HW device D8 698, and a device driver 684 for HW device D9 699. DCRC module 676 is communicatively coupled to device driver 680 through communication link 678. DCRC module 676 is communicatively coupled to device driver 684 through communication link 682. Device driver 680 is communicatively coupled to HW device D8 698 through communication link 681. Device driver 684 is communicatively coupled to HW device D9 699 through communication link 685.

Processor core N 686 includes a DCRC module 688. In other examples, system 600 may include any suitable number of processor cores in a tree topology with each processor core including any suitable number of subscribed clients including DMA clients and other processor cores.

In one example, communication links 617, 623, 639, 651, and 655 are used to communicate clock rate change parameters and suspend and resume requests from DCRC module 604 to DCRC modules 626, 642, 658, 676, and 688. In one example, the clock rate change parameters include the new clock rate. Communication links 609, 613, 631, 635, 663, 681, and 685 send suspend and resume requests to HW devices 691, 692, 693, 694, 697, 698, and 699, respectively, during a clock rate change process. System 600 operates similarly to system 400 previously described and illustrated with reference to FIG. 7, except that in system 600 a processor core may have more than one other processor core as a client for the clock rate change process.

Examples described herein provide for synchronously changing the clock rate in a system including multiple processor cores and a shared DRAM. The examples are scalable to any suitable number of processor cores and DMA clients. The number of processor cores in the system and the number of DMA clients subscribed to each processor core does not need to be known. Hence, the examples are backward compatible. In addition, the examples do not need specialized hardware for synchronizing the various hardware subsystems prior to a clock rate change since the clock rate change is controlled by one of the processor cores.

Although specific examples have been illustrated and described herein, it will be appreciated by those of ordinary skill in the art that a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

What is claimed is:

1. A system comprising:
   a shared memory;
   a plurality of processor cores communicatively coupled to the shared memory;
   a processor core memory; and
   a clock subsystem for providing a clock signal to the shared memory and the plurality of processor cores,
   wherein each of the plurality of processor cores executes instructions stored in the processor core memory for synchronously changing the clock rate provided by the clock subsystem to the plurality of processor cores.

2. The system of claim 1, wherein each of the plurality of processor cores executes instructions stored in the processor core memory to:
   receive a prepare for change signal from a source;
   suspend accessing the shared memory in response to receiving the prepare for change signal;
   send a prepare for change done signal to the source in response to suspending access to the shared memory;
   receive a rate change done signal from the source in response to the clock rate being changed; and
   resume accessing the shared memory in response to the rate change done signal.

3. The system of claim 2, wherein the prepare for change signal is received from one of the plurality of processor cores.

4. The system of claim 1, further comprising:
   a plurality of Direct Memory Access (DMA) clients, each of the DMA clients subscribed to one of the plurality of processor cores,
   wherein the clock subsystem provides the clock signal to each of the plurality of DMA clients, and
   wherein each processor core having a subscribed DMA client executes instructions stored in the processor core memory for synchronously changing the clock rate provided by the clock subsystem to the plurality of DMA clients.

5. The system of claim 4, wherein each of the plurality of processor cores executes instructions stored in the processor core memory to:
   receive a first prepare for change signal from a source;
   send to any DMA clients subscribed to the processor core a second prepare for change signal in response to the first prepare for change signal such that the subscribed DMA clients stop accessing the shared memory;
   receive a first prepare for change done signal from each subscribed DMA client once each subscribed DMA client has stopped accessing the shared memory;
   suspend accessing the shared memory in response to receiving the first prepare for change done signal from each subscribed DMA client;
   send a second prepare for change done signal to the source;
   receive a first rate change done signal from the source in response to the clock rate being changed;

resume accessing the shared memory in response to the first rate change done signal; and send a second rate change done signal to the subscribed DMA clients to inform the subscribed DMA clients to resume accessing the shared memory.

6. A system comprising:
a Dynamic Random Access Memory (DRAM);
a plurality of processor cores communicatively coupled to the DRAM;
a processor core memory;
a plurality of Direct Memory Access (DMA) clients communicatively coupled to the DRAM, each of the DMA clients subscribed to one of the processor cores; and
a clock subsystem for providing a clock signal to the DRAM, the plurality of processor cores, and the plurality of DMA clients,
wherein each of the processor cores executes instructions stored in the processor core memory to synchronously change the clock rate provided by the clock subsystem.

7. The system of claim 6, wherein one of the of processor cores executes instructions stored in the processor core memory to:
receive a first prepare for change signal in response to a low power mode request;
send another one of the processor cores a second prepare for change signal;
receive a first prepare for change done signal from the other one of the processor cores in response to the other one of the processor cores suspending access to the DRAM;
suspend access to the DRAM in response to the first prepare for change done signal;
resume access to the DRAM in response to a rate change of the clock signal provided by the clock subsystem;
send the other one of the processor cores a rate change done signal; and
receive an acknowledge done signal from the other one of the processor cores in response to the other one of the processor cores resuming access to the DRAM.

8. The system of claim 6, wherein one of the of processor cores executes instructions stored in the processor core memory to:
receive a first prepare for change signal in response to a low power mode request;
send one of the DMA clients as second prepare for change signal;
receive a first prepare for change done signal from the DMA client in response to the DMA client suspending access to the DRAM;
suspend access to the DRAM in response to the first prepare for change done signal;
resume access to the DRAM in response to a rate change of the clock signal provided by the clock subsystem;
send the DMA client a rate change done signal; and
receive an acknowledge done signal from the DMA client in response to the DMA client resuming access to the DRAM.

9. The system of claim 6, wherein each of the plurality of DMA clients comprises one of a Universal Serial Bus (USB) host, a USB device, an Ethernet device, a WiFi device, a Liquid Crystal Display (LCD) controller, a NAND flash controller, an audio device, and a photo device.

10. The system of claim 6, wherein the system comprises a printer.

11. A method comprising:
notifying, via a primary processor core, registered clients in a system including a plurality of processor cores to stop accessing a shared Dynamic Random Access Memory (DRAM);
receiving, at the primary processor core, confirmation from the registered clients that the registered clients have stopped accessing the shared DRAM;
entering a self refresh mode for the shared DRAM;
changing a clock rate of a clock signal provided to each of the plurality of processor cores and each registered client;
exiting a self refresh mode for the shared DRAM; and
notifying, via the primary processor core, the registered clients of completion of the clock rate change.

12. The method of claim 11, wherein in response to receiving confirmation from the registered clients that the registered clients have stopped accessing the shared DRAM, the method further comprises:
disabling interrupts of the registered clients;
checking for a bus idle state to confirm that the shared DRAM is not being accessed; and
blocking all DRAM requests via the bus.

13. The method of claim 11, wherein in response to receiving confirmation from the registered clients that the registered clients have stopped accessing the shared DRAM, the method further comprises;
jumping code execution to one of Tightly Coupled Memory (TCM), Local Static Random Access Memory (LSRAM), and cache memory of the primary processor core.

14. The method of claim 11, wherein notifying the registered clients to stop accessing the shared DRAM comprises:
sending from the primary processor core to a registered client a prepare for change signal;
suspending access to the shared DRAM at the registered client in response to the prepare for change signal; and
sending from the registered client to the primary processor core a prepare for change done signal in response to suspending access to the shared DRAM at the registered client.

15. The method of claim 14, wherein notifying the registered clients of completion of the clock rate change comprises:
sending from the primary processor core to the registered client a rate change done signal;
resuming access to the shared DRAM at the registered client in response to the rate change done signal; and
sending from the registered client to the primary processor core an acknowledge signal indicating that the registered client has resumed accessing the shared DRAM.

* * * * *

UNITED STATES PATENT AND TRADEMARK OFFICE
CERTIFICATE OF CORRECTION

| | |
|---|---|
| PATENT NO. | : 8,711,653 B2 |
| APPLICATION NO. | : 13/517618 |
| DATED | : April 29, 2014 |
| INVENTOR(S) | : Nayak et al. |

Page 1 of 1

It is certified that error appears in the above-identified patent and that said Letters Patent is hereby corrected as shown below:

On the Title Page, Item (63)

Please add the following paragraph before the first paragraph beginning at page 1, line 1:

RELATED APPLICATIONS
Benefit is claimed under 35 U.S.C. 119(a)-(d) to Foreign application Serial No. 1673/CHE/2012 entitled "CHANGING A SYSTEM CLOCK RATE SYNCHRONOUSLY" by Hewlett-Packard Development Company, L.P., filed on April 28, 2012, which is herein incorporated in its entirety by reference for all purposes.

Signed and Sealed this
Twenty-fifth Day of November, 2014

Michelle K. Lee
*Deputy Director of the United States Patent and Trademark Office*